United States Patent
van Staalduinen et al.

(10) Patent No.: US 9,235,259 B2
(45) Date of Patent: Jan. 12, 2016

(54) METHOD FOR DETECTING AUDIO TICKS IN A NOISY ENVIRONMENT

(75) Inventors: Mark van Staalduinen, 's-Gravenzande (NL); Victor Bastiaan Klos, The Hague (NL); Peter Jan Otto Doets, Delft (NL)

(73) Assignee: NEDERLANDSE ORGANISATIE VOOR TOEGEPAST-NATUURWETENS CHAPPELIJK ONDERZOEK TNO, Delft (NL)

( * ) Notice: Subject to any disclaimer, the term of this patent is extended or adjusted under 35 U.S.C. 154(b) by 735 days.

(21) Appl. No.: 13/512,139

(22) PCT Filed: Nov. 26, 2010

(86) PCT No.: PCT/NL2010/050795
§ 371 (c)(1),
(2), (4) Date: Jul. 3, 2012

(87) PCT Pub. No.: WO2011/065828
PCT Pub. Date: Jun. 3, 2011

(65) Prior Publication Data
US 2012/0288103 A1  Nov. 15, 2012

(30) Foreign Application Priority Data
Nov. 27, 2009 (EP) .................................. 09177411

(51) Int. Cl.
| H04R 29/00 | (2006.01) |
| G06F 3/00 | (2006.01) |
| G06F 1/16 | (2006.01) |
| G06F 3/01 | (2006.01) |
| G10L 25/48 | (2013.01) |

(52) U.S. Cl.
CPC .............. *G06F 3/002* (2013.01); *G06F 1/1626* (2013.01); *G06F 3/017* (2013.01); *G10L 25/48* (2013.01); *G06F 2200/1636* (2013.01)

(58) Field of Classification Search
CPC combination set(s) only.
See application file for complete search history.

(56) References Cited

U.S. PATENT DOCUMENTS

| 2003/0132950 A1* | 7/2003 | Surucu et al. .................. 345/700 |
| 2005/0204904 A1 | 9/2005 | Lengeling et al. |

(Continued)

FOREIGN PATENT DOCUMENTS

| EP | 1 978 508 | 10/2008 |
| EP | 2 018 032 | 1/2009 |

(Continued)

*Primary Examiner* — Duc Nguyen
*Assistant Examiner* — Assad Mohammed
(74) *Attorney, Agent, or Firm* — Preti Flaherty Beliveau & Pachios LLP

(57) ABSTRACT

A method for detecting, in an audio signal including a stream of audio samples (y(n), (y'(n)), ticks in a noisy environment, comprises the steps of applying the signal to a coarse tick detection processor arranged to decide whether it is likely that the signal includes a tick and, only then, enabling a fine tick detection processor to decide, by more thorough processing the audio signal, whether the audio signal represents an audio tick. The coarse processing step preferably includes buffering audio samples (y(n), (y'(n)), determining the maximum and minimum values of each sample, forming their local range, delaying the local range with one or more samples and comparing the difference between the actual local range and the delayed local range with a threshold value ($T_c$), and, if the difference exceeds the threshold value, outputting a trigger ($n_c$) for enabling the fine detection processor The fine processing step preferably includes buffering audio samples (y(n), (y'(n)), computing, for each buffer content ($B_p(n,m)$), a Fast Fourier Transformed buffer content ($E_c(\omega,m)$), determining the difference ($F_c(\omega,m)$) between the resulting frequency components, comparing the difference ($F_c(\omega,m)$) to the content of a previously trained fingerprint set ($F^*(\omega,m)$) and calculating a correlation coefficient ($p(F_c,F^*)$) between them, comparing the correlation coefficient to a threshold value ($T_F$) and, if the correlation coefficient exceeds the threshold value, outputting a signal indication the presence of a tick in the audio signal.

23 Claims, 3 Drawing Sheets

(56) References Cited

U.S. PATENT DOCUMENTS

| | | | |
|---|---|---|---|
| 2009/0153342 A1* | 6/2009 | Thorn | G06F 1/1626 340/669 |
| 2009/0176505 A1* | 7/2009 | Van Deventer | G06F 1/1626 455/456.1 |
| 2009/0215397 A1* | 8/2009 | Thorn et al. | 455/41.2 |

FOREIGN PATENT DOCUMENTS

| | | |
|---|---|---|
| EP | 2 073 515 | 6/2009 |
| WO | WO 2006/094739 | 9/2006 |

\* cited by examiner

METHOD FOR DETECTING AUDIO TICKS IN A NOISY ENVIRONMENT

FIELD OF THE INVENTION

The invention refers to a method and means for detecting audio ticks in a noisy environment. In particular said tick detection is envisaged to be used in mobile terminals in which tapping the terminals together—causing a tapping tick sound—is used as (part of a pairing protocol.

BACKGROUND

A pairing protocol is disclosed in International Patent Application WO 2009/014438. This document describes a method to enable two mobile terminals to establish each others identity. One mobile terminal is physically tapped (softly hit) against the other. Both terminals detect the tapping. The terminals send messages identifying themselves and providing information about the detected tapping. When it is determined that the information about the detected tapping of two terminals matches, acknowledgement messages are sent to the mobile terminals to establish the mutual identification.

This method has a problem in that not each relatively loud and short noise is a tick caused by tapping terminals together, where too many "false ticks" affect the ease and usefulness of such a "tap-to-pair" system.

Another problem is that discrimination of ticks from non-ticks, especially in noisy environments needs much processing capacity when implemented in conventional ways, where the processing capacity of (small) mobile terminals is restricted and, besides, the terminal's battery has a limited capacity.

EP 1978508 discloses a method of musical beat detection for Karaoke purposes, among others. A musical tune is composed on the basis of a measure of time, such as a bar and a beat. The bar and beat determine the musical rhythm. The document describes system for determining beat position time points in from audio wave files. It is proposed to detect beat positions from large instantaneous peaks in the time-series waveform. But since beat components cannot be extracted highly accurately from a time-series waveform, an alternative is disclosed wherein a spectrogram is computed using an FFT (Fast Fourier Transform) on the time-series waveform. The system considers portions of the spectrogram at which the power spectrum instantaneously changes significantly. These are assumed to be beat components of the rhythm, due to hitting a drum for example.

EP 1978508 notes that such a beat detection does not provide in accurate beat timing extraction. To improve the accuracy an alignment process is performed on the beat position information of a musical tune or musical tune portions expected to have an identical tempo in the extracted beat position information. Such musical tune portions may be selected based on the variance of beat timing. By realigning the time points according to the tempo more accurate positioning of the beat is realized.

Thus, in EP 1978508 initial coarse detection of beat position from audio data in the audio file is followed by further processing of the detected positions. EP 1978508 does not propose to process the audio data itself more thoroughly. EP 1978508 would not be considered for a pairing protocol, because one cannot expect users of mobile terminals against each other according to a musical rhythm that lasts long enough to provide for a musical tune portion expected to have an identical tempo.

SUMMARY

One aim is to provide a method and apparatus for the reliable detection of audio ticks in noisy environments.

Another aim is to provide a method and apparatus for the detection of audio ticks in noisy environments which are suitable for execution by (small) mobile terminals having a limited computing capacity.

Accordingly, a method for detecting ticks in a noisy environment is provided, from an audio signal which includes a stream of audio samples. The method comprises the steps of:
 applying the audio signal to a coarse tick detection processor arranged to decide whether it is likely that the audio signal includes a tick and, only then,
 enabling a fine tick detection processor to decide, by more thorough processing said audio signal, whether the audio signal represents a tick.

In an embodiment, the method is used to detect ticks arising from touches against a specific device. In this embodiment, the fine tick detection may be performed dependent on comparison with predetermined properties of an audio response to the touches that are characteristic for the specific device, whereas coarse tick detection may be performed in a more simple generic way that does not depend a comparison with properties of the specific device. A computation of a correlation between the detected sound signal and a reference sound signal may be used to perform the comparison. The reference properties or reference signal may be determined in advance by training using the specific device, but if the reference properties or reference signal are substantially the same for all devices in a class, the reference properties or reference signal for another device or devices in the class may be used.

It will be understood that the ticks are typically sounds of a relatively short duration which may be contained in the audio signal, which audio signal will also contain noise. It will further be understood that the coarse tick detection processor (arranged for coarse processing) and the fine tick detection processor (arranged for fine processing) may be implemented in either hardware or software, or in a combination of hardware and software. Accordingly, the first step may be referred to as coarse processing the audio signal so as to decide whether the audio signal contains at least one tick sound, while the second step may be referred to as fine processing the audio signal so as to confirm whether the audio signal contains a tick sound. It will be understood that the terms "coarse processing" and "fine processing" are relative.

According to an aspect, therefore, the method for detecting, in an audio signal, ticks in a noisy environment, is preferred to comprise the steps of:
 coarse processing the signal, including normalizing it;
 deciding, based on the value of the normalized signal whether the signal should be subjected to fine processing or not;
 fine processing the signal, including converting the signal from the time domain into the frequency domain;
 comparing, in the frequency domain, the signal with an exemplary sample of an audio tick;
 deciding whether the audio signal represents an audio tick or not.

This is based on the understanding that, for "tick detection" in a "tap-to-pair" system using mobile terminals which have only restricted computing capacity, a two-step computing approach is most suitable, i.e. a coarse processing step which does not need intensive computing, and a fine processing step which does require more computing power in order to perform well, but which is only executed if the coarse step is positive, i.e. indicates that the signal part probably represents a sound tick. Moreover, the fine processing step is only executed using the (restricted) signal part selected by means of the coarse processing step, causing that always the only a relative small signal parts will be intensively processed.

Preferably, the coarse processing step includes buffering audio samples, determining the maximum and minimum values of each sample, forming their local range, delaying said local range with one or more samples, and comparing the difference between the actual local range and the delayed local range with a threshold value, and, if the difference exceeds the threshold value, outputting a trigger for enabling said fine detection processor.

More preferably, the fine processing step includes buffering audio samples, computing, for each buffer content, a Fast Fourier Transformed buffer content, determining the difference between the resulting frequency components, comparing said difference to the content of a previously trained reference set and calculating a correlation coefficient between them, comparing said correlation coefficient to a threshold value and, if the correlation coefficient exceeds the threshold value, outputting a signal indication the presence of a tick in the audio signal. The reference set may be called a fingerprint set.

Hereinafter the complete processing will be outlined in detail. As already stated before, the detection should be:
  robust in terms of small false positive and negative rates. This is achieved by forming a reference of a touch that is specific for a mobile device by means of a training method. This reference exploits characteristics of the audio signal of a touch;
  efficient in terms of battery use, what requires to minimize the use of complex operators. This is achieved by a coarse-to-fine approach, where using simple operations most touches are detected plus some noisy touch. In the fine stage, is test whether the touch matches with touch characteristics.

Fine detection may be used to cause mutual identification op a pair of mobile communication that were tapped together to generate the tick, as described for WO 2009/014438, or to open a communication channel between the mobile communication devices.

A system is provided for detecting, in an audio signal which includes a stream of audio samples, ticks in a noisy environment, the system comprising a coarse tick detection processor and a fine tick processor, wherein the course tick processor is arranged to decide whether it is likely that the signal includes a tick and, only then, to enable the fine tick detection processor to decide, by more thorough processing said audio signal, whether the audio signal represents an audio tick. The coarse tick detection processor and a fine tick processor may be a same processor, operating under control of respective software modules for coarse and fine tick detection respectively.

Further a computer program product is provided for carrying out the method as defined above. A computer program product may comprise a set of computer executable instructions stored on a data carrier, such as a computer readable disk like a CD or a DVD or a magnetic disk or a semi-conductor memory. The set of computer executable instructions that, when executed, make a programmable computer carry out the method as defined above, may also be available for downloading from a remote server, for example via the Internet.

Still further provides a consumer product is provided, comprising a system as defined above, which consumer product may be a mobile telephone device. Additionally provides a server is provided for identifying proximate devices, which server is arranged for carrying out the method as defined above and/or comprises a system as defined above.

BRIEF DESCRIPTION OF THE DRAWING

These and other objects and advantageous aspects will become apparent from a description of exemplary embodiments.

DETAILED DESCRIPTION OF EXEMPLARY EMBODIMENTS

Figure 1:
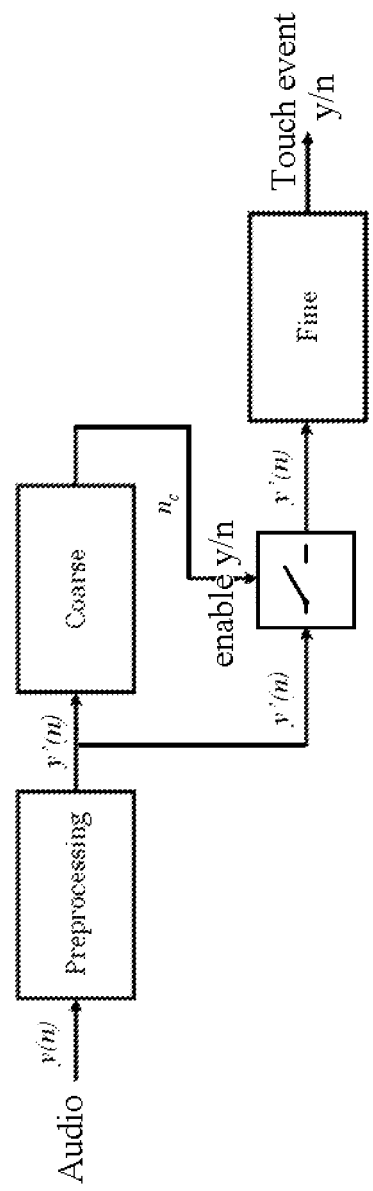
FIG. 1 shows an overview of the preferred embodiment of the system, showing its main modules.

FIG. 1 shows that an audio signal y(n) which is investigated whether it includes a portion representing a "tick", is fed to an (optional) preprocessing module (shown in FIG. 2 more in detail) in which the signal is normalized in order to facilitate further processing. The preprocessed signal y'(n) is fed to a coarse tick detection processor (shown in FIG. 3 more in detail) which decides whether it is likely that the signal (part) y'(n) represents a tick or not. In the first case a trigger value $n_c$ is set which enables—represented by a switch—to feed the preprocessed signal y'(n) to a fine detection processor (shown in figure FIG. 4 more in detail) in order to have it processed there. Absence of the trigger disables the fine processing. Due to this enabling/disabling control output by the coarse processor the fine detection processor (which requests relatively much processing capacity) is solely enabled when the coarse processor (which does not need much processing capacity) "suspects" the presence of a "tick" in an audio signal portion and converts this "suspicion" into enabling trigger.

It is noted that, although the enabling/disabling function has been represented by a switch (symbol), this enabling/disabling function can be implemented in several other ways. Important is that the fine processor is solely activated or involved (anywise), by means an "enable" trigger (signal) from the coarse processor.

Figure 2:
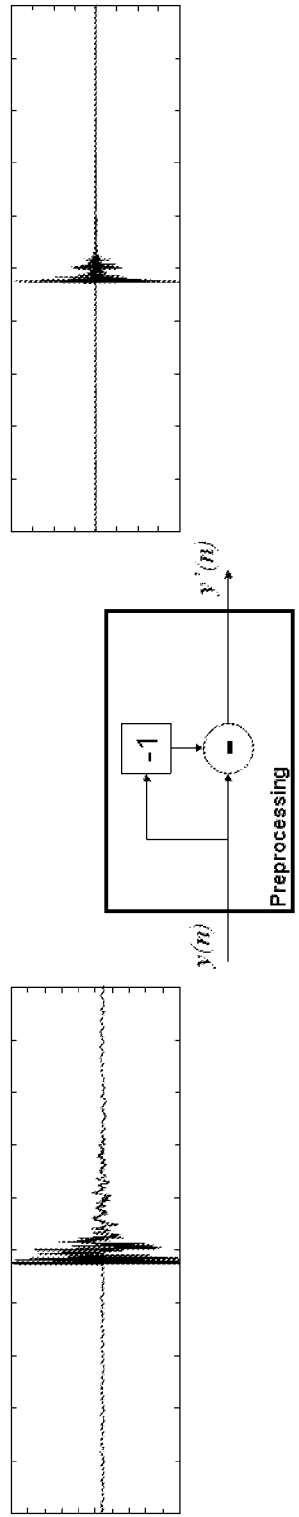
FIG. 2 shows a preprocessing module.

FIG. 2 shows the preprocessing module in which the difference y'(n) is generated between each audio sample y(n) and its previous audio sample y(n−1). This action is performed by the shown digital delay circuit.

Figure 3:
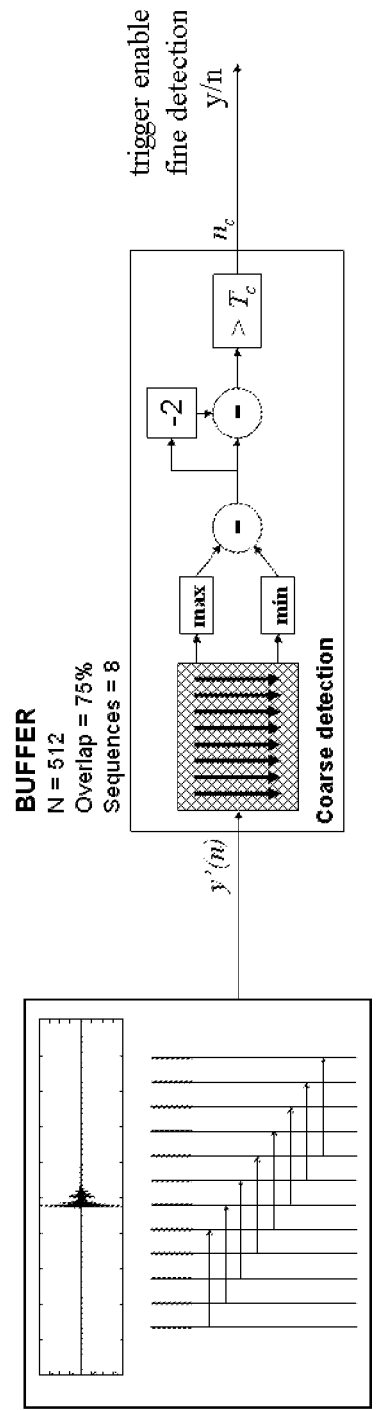
FIG. 3 shows a coarse processing module and illustrates loading of its input buffer.

FIG. 3 illustrates, at the left side of the figure, the construction of an input buffer for the coarse processor which is always loaded with 75% overlapping audio samples. In that way the buffer collects the last 16 normalized samples whereafter the maximum and minimum values of the collected samples can be selected. The difference between these values determine the local range. In a next step the local range is delayed with two samples. The difference between the current range and the delayed range is tested by a threshold: if the difference is larger than a threshold value $T_c$ then a trigger $n_c$ is produced, causing enablement of the fine detection processor; otherwise no such trigger is given.

Figure 4:
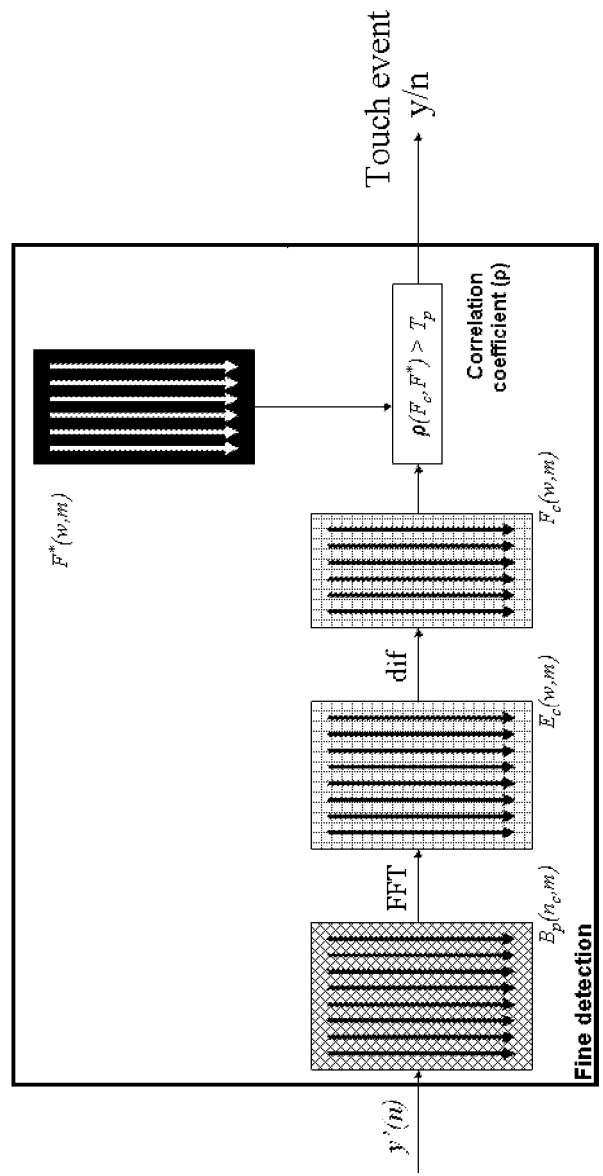
FIG. 4 shows a fine processing module.

FIG. 4 presents an embodiment of a fine detection processing module, where a fast Fourier transform is computed for each buffer, and the difference is determined between the resulting frequency components. This difference is compared then to a (previously stored) trained reference (top right)

using a correlation coefficient. This configuration is scale invariant, causing that both soft and heavy touches (ticks) are detected correct. The trained reference may be obtained for example by signaling when a touch is generated, determining properties of the audio signal at that time and storing the generated properties, or storing averages of the properties obtained with respective touches. Training may also comprise determining relative weights that may be assigned to different properties, based on the observed spread in the values obtained using respective touches during training. Training may have the advantage that detection accounts for the particular mechanical vibration modes of the device that is touched and used to receive the audio signal (e.g. the vibration modes of its housing).

Summarizing the complete processing when the fine processor, under control of the coarse processor output $n_c$, has been enabled, the content $y(n)$, recorded by e.g. the microphone of a mobile device is normalized to a zero-mean signal $y'(n)$ which is buffered with (e.g. 75%) overlap in the time domain, resulting in a matrix $B_p(n,m)$. Fourier transformation (FFT) is performed on that buffer content $B_p(n,m)$ resulting in a matrix $E_c(w,m)$ which is also buffered with overlap in the time domain. Finally the frequency wise difference between the (FFT) buffers is calculated, resulting in a matrix $F_c(w,m)$, also buffered with overlap in the time domain, which matrix $F_c(w,m)$ is compared to a reference matrix $F^*(\omega,m)$. When the resulting correlation coefficient exceeds a predetermined threshold value, the microphone signal is deemed to include a "tick", which can be used as (part of) a pairing protocol as e.g. disclosed in WO 2009/014438.

A more detailed discussion of the coarse and fine audio signal processing steps will be given below.

Coarse Detection

A sample of the audio signal recorded by a mobile device is given by $y(n)$ ($y(n) \in [-1,1]$), where n ($n \in N$) is its sample number. The audio signal is sampled with a frequency f with unit samples per second. The touches in this example touches were sampled with a sample frequency of 11025 Hz. The audio signal could be biased with a constant, which suppressed by taking the sample difference:

$$y'(n) = y(n) - y(n-1). \tag{1}$$

Actually, this is a basic high pass filter. In the coarse approach a touch is detected, if the local difference between maximum and minimum signal range increases significantly. This point of change represents the start of the touch. This sample is detected as follows.

The signal is buffered using a first-in-first-out (FIFO) buffer that contains $N_c$ ($N_c \in N$) samples. This buffer is given by $$B_c(n) = B_c[y'](n) = \{y'(n-N_c+1), \ldots, y'(n-1), y'(n)\}. \tag{2}$$

From this buffer the difference between maximum and minimum is computed, which represents the signal range R in the last $N_c$ samples:

$$R(n) = \max B_c(n) - \min B_c(n). \tag{3}$$

If this range increases with more than $T_c$, then a coarse touch $\delta'$ is detected. As soon as a coarse touch is detected, another touch cannot be detected within the next $N_c$ samples.

$$\delta'(n) = \begin{cases} 1 & \text{if } R(n) - R(n-2) > T_c, \\ \delta'(n-N_c), \ldots, \delta'(n-2), \delta'(n-1) = 0, \\ 0 & \text{otherwise}. \end{cases} \tag{4}$$

FIG. 1 presents the detection of the coarse touch sample for an example. The sample $n_c$ is the start sample of a touch:

$$n_c = \{n | \delta'(n) = 1\}. \tag{5}$$

This approach detects most touches, also within noisy environments. Therefore, the false negative rate is rather high. On the other hand it detects more than touches, each event that causes a change in the range of the audio signal is identified as a touch. Therefore, the next stage explores another signal property of a touch to reduce the false negative rate.

Other types of course detection may be used, such as detection of output pulses based on a comparison of pulse amplitude with signal amplitude in a time interval that surrounds the pulse.

Fine Detection

Precise touch detection exploits the signal characteristic of a touch. A primitive model of a touch is a pulse, and an important property of a pulse is that its Fourier Transform (FT) is a uniform energy spectrum for all frequency components according to [2]. This property is exploited using the FT applied to FIFO buffers before and after a coarse touch. In total $N_b$ ($N_b \in N$) buffers are filled containing $N_p$ ($N_p \in N$) samples with p ($p \in [0,1]$) percentage of overlap. The last sample in buffer m ($m \in \{0, \ldots, N_b - 1\}$) for coarse touch $n_c$ is given by $$n_c(m) = n_c + m N_p (1-p), \tag{6}$$

such that buffer m is given by $$B_p(n_c,m) = \{y'(n_c(m) - N_p), \ldots, y'(n_c(m) - 2), y'(n_c(m) - 1)\}. \tag{7}$$

Note that the first buffer (m=0) does not contain sample $n = n_c$, which was the first sample of a touch. For each buffer is the FT computed, such that the energy of each frequency component ($\omega$) is given by $$E_c(\omega,m) = \log_{10} |[B_p(n_c,m)](\omega)|. \tag{8}$$

The fast FT is used to compute the energy spectrum fast. For this reason the number samples in a buffer is a power of two: $N_p \in 2^k$, $k \in 1, 2, \ldots$.

The energy of the frequency components is used to represent a reference, which will be called a fingerprint of a touch, which is given by $$F_c(\omega,m') = E_c(\omega,m') - E(\omega,m'-1). \tag{9}$$

FIG. 2 presents this fingerprint as an image. The difference is only computed if the energy components exist, such that $m' \in \{0, \ldots, N_b - 3\}$. The difference between the energy components is taken for three reasons:

1. The difference between buffers with and without touch properties capture the touch properties.

2. The recorded signal y is a superposition of a touch plus background signals, which we assume stationary within the buffers. Influence of these background signals is suppressed by this difference.

3. Due to this difference the average is by definition equal to zero, such that it is allowed to compute a correlation coefficient to compare fingerprints according to [1].

TABLE 1

Overview of parameter used for touch detection

| Parameter | Range | Description |
|---|---|---|
| $N_c$ | 16 | Number of samples in coarse buffer |
| $T_c$ | 0.6 . . . 1.0 | Threshold applied to range change difference |
| $N_p$ | 512 | Number of samples in precise buffer |

TABLE 1-continued

Overview of parameter used for touch detection

| Parameter | Range | Description |
| --- | --- | --- |
| $N_b$ | 5 ... 8 | Number of precise buffers |
| p | 0.75 | Percentage of overlap between buffers |
| $T_p$ | 0.6 ... 0.8 | Threshold applied to range change difference |

From multiple touches the optimal fingerprint F* is learned as its average. This fingerprint is device specific on which the touch is detected. This fingerprint is compared to the measured fingerprint ($F_c$) using the correlation coefficient ($\rho \in [-1,1]$):

$$\rho[F_c, F^*] = \frac{\sum_{\omega,m} F_c(\omega, m) F^*(\omega, m)}{\sqrt{\left(\sum_{\omega,m} F_c(\omega, m)^2\right)\left(\sum_{\omega,m} F^*(\omega, m)^2\right)}} \quad (10)$$

Most important for robust fingerprint computation is that the start sample of a touch ($n_c$) is detected correctly, such that the fingerprint exploits always the same touch characteristics. This solution is innovative.

Using this comparison the precise touch is detected as $$\delta(n) = \begin{cases} 1 & \text{if } \rho[F_c, F^*] > T_p, \\ & \delta'(n) = 1, \\ 0 & \text{otherwise.} \end{cases} \quad (11)$$

Touch detection is based on quite some parameters. Table 1 presents an overview of these parameters with their range of use.

Although an advantageous example of a comparison of properties of the audio signal with the fingerprint has been illustrated by means of correlation of spectral properties, it should be appreciated that other ways of comparing may be used. For example, the values of the spectral properties may be compared directly, the tick being detected when no difference exceeds a threshold, or no more than a predetermined number of differences exceeds a threshold, or an aggregate difference does not exceed a threshold. Instead of spectral values other properties may be compared, for example the results of filtering the audio signal with different predetermined filters, or a time correlation may be used.

In summary, coarse touch detection presents an efficient method to detect touches, because the used operators are simple: buffer, maximum, minimum, difference and a comparison. Precise touch detection is not efficient, because a Fourier transform is computed. Since it is only computed, if a coarse touch is detected, it achieves a minimum processor and power use.

Although coarse and fine touch detection from an audio signal have been described, the skilled person will appreciate that the detection method does not depend on whether the sound arises from a touch. Nor does it depend on the type of objects that are touched. However, almost all tick sounds are produced by touching objects. According to one aspect the method is applied to mobile communication devices (commonly referred to as mobile devices in the telecommunication art), in order to form pairs of such devices as explained in WO 2009/014438. As noted in this document the detected touch may be a touch of the mobile devices themselves, or external touches such as clapping hands within detection range from the mobile devices.

Each mobile device has a microphone and a processing unit. An audio identifier may be produced by tapping mobile devices together. The tapping sound is received by the microphones of both mobile devices and the audio signals registered by the microphones of the respective devices is supplied to the processing units of the respective devices. The processing unit of the devices may comprise the preprocessing module, the coarse processing module and/or the fine processing module. These modules may be realized for example using a programmable processor and program modules with programs of instructions for the programmable processor that make the programmable processor perform the functions of the preprocessing module, the coarse processing module and/or the fine processing module.

The embodiments may be used in methods and systems for matching proximate devices, and also in devices, such as servers, for use in such systems. An example of a system for matching proximate devices is disclosed in WO 2009/014438 mentioned above. A method of identifying proximate mobile devices, may be used wherein the method comprises a first mobile device detecting a tick, a second mobile device detecting the tick, the first mobile device sending a request message associated with the tick to the second mobile device, and the second mobile device, upon receipt of the request message, sending an acknowledgement message to the first mobile device so as to establish mutual identification. The request message and/or the acknowledgement message may comprise information about the detected tick, so that at least one device is enabled to verify that the devices have detected the same tick by comparing the information about the detected tick from both devices. Alternatively, a server may perform the verification and send confirmation messages to one or both mobile devices, or establishes a communication channel between the mobile devices if the information about the detected tick from both devices matches. Alternatively the devices may send request messages with their information about the tick to the server and the server may send acknowledgement messages to a pair of devices when it is verified that these devices have both detected the same tick.

Advantageously, the embodiments may be utilized in consumer devices, such as mobile telephone devices, PDAs (Personal Digital Assistants), computers, in particular portable (e.g. laptop and notebook) computers, electronic book viewers, and other consumer devices. In an embodiment the coarse tick detection processor is part of a mobile device and the fine tick detection processor is part of a server. In this case the mobile device may be configured to perform coarse tick detection and to transmit selected audio signal data to the server in response to detection of a tick by said coarse tick detection, the selected audio signal data comprising audio signal data that resulted in the coarse tick detection. Audio signal data from a time window of predetermined length may be selected that comprises a time point at which the coarse tick was detected. In this embodiment the server receives the selected audio signal data and applies the fine tick detection to the audio signal data.

A system is provided for detecting ticks in a noisy environment, from an audio signal which includes a stream of audio samples (y(n), y'(n)), the system comprising a coarse tick detector and a fine tick detector, wherein the course tick detector is arranged to perform an initial detection of ticks from the audio signal and to trigger the fine tick detector to perform fine tick detection only when the course tick detector has made an initial detection of a tick, the fine tick detection comprising more thorough processing of said audio signal than course tick detection. In an embodiment the system comprises a mobile communication device with a microphone, coupled to the coarse tick detector and a fine tick detector to supply the audio signal, the fine tick detector being configured to compare properties of the audios signal with reference properties that are specific to the mobile device, the coarse tick detector only performing generic processing without a comparison with reference properties that are specific to the mobile device. The system may be configured to provide information to the mobile communication device that establishes the identity of another mobile communication device that was used to generate the tick by touching the mobile communication device, or to open a communication channel between the devices, triggered by fine detection.

It is noted that any terms used in this document should not be construed so as to limit the scope of the invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the invention is not limited to the embodiments illustrated above and that many modifications and additions may be made without departing from the scope of the invention as defined in the appending claims.

REFERENCES

[1] A. Leon-Garcia: Probability and Random Processes for Electrical Engineering. Number 0-201-50037-X. Addison-Wesley Publishing Company, Inc., second edition, 1994.
[2] B. Porat: A course in digital signal processing. John Wiley & Sons, Inc., New York, N.Y., USA, 1996.

The invention claimed is:

1. Method for detecting ticks on a device with which an audio signal is received in a noisy environment, from the audio signal which includes a stream of audio samples (y(n), (y'(n)), the method comprising the steps of:
   applying the audio signal to a coarse tick detection processor arranged to decide whether the audio signal likely includes a tick; and
   only if the course tick processor decides that the audio signal likely includes a tick, enabling a fine tick detection processor to decide, by more thorough processing of said audio signal, whether the audio signal represents a tick on the device, wherein the fine tick detection is performed using a comparison with a previously trained set of reference properties that are characteristic for the device with which the audio signal is received.

2. Method according claim 1, wherein the stream of audio samples is derived from a microphone of a mobile communication device that captures sound generated by tapping the mobile communication device against other objects and noise from an environment of the mobile communication device.

3. Method according claim 1, wherein said comparison comprises computing a correlation coefficient between the reference properties and information derived from the stream of audio samples.

4. Method according claim 1, wherein the coarse processing step includes buffering a series of audio samples (y(n), (y'(n)) in a buffer, determining maximum and minimum values from this buffer, computing a local range between the maximum and minimum values, delaying said local range with one or more samples, and comparing a difference between an actual local range and the delayed local range with a threshold value ($T_c$), and, if the difference exceeds the threshold value, outputting a trigger ($n_c$) for enabling said fine detection processor.

5. Method according to claim 1, wherein the fine processing step includes buffering the audio samples (y(n), (y'(n)) from a time interval that has been decided to likely include the tick by the coarse tick detection into buffer contents that include a buffer content with said tick and a buffer content that precedes said tick, computing, for each buffer content ($B_p(n,m)$), a Fast Fourier Transformed buffer content ($E_c(w,m)$), obtaining frequency components from the Fast Fourier Transformed buffer content ($E_c(w,m)$), determining a difference ($F_c(w,m)$) between frequency components for the buffer contents with said tick and preceding said tick, comparing said difference ($F_c(w,m)$) to contents of a previously trained reference set ($F^*(w,m)$) and calculating a correlation coefficient ($\rho(F_c,F^*)$) between them, comparing said correlation coefficient to a threshold value ($T_p$) and, if the correlation coefficient exceeds the threshold value, outputting a signal indicating the presence of a tick in the audio signal.

6. Method according to claim 5, comprising a training step, wherein a reference set of a touch is formed that is specific for a mobile device from which the stream of audio samples is derived using a microphone of a mobile communication device.

7. Method according to claim 1, wherein the audio signal is preprocessed before being processed in the coarse and/or fine processing steps respectively, including determining and outputting a difference (y'(n)) between each audio sample (y(n)) and a previous audio sample (y(n−x)).

8. A non-tangible computer readable storage medium comprising a program of instructions for making a programmable computer to carry out one or more of the method steps according to claim 1.

9. System for detecting, in an audio signal which includes a stream of audio samples (y(n), (y'(n)), ticks on a device with which the audio signal is received in a noisy environment, the system comprising a coarse tick detection processor and a fine tick processor, wherein the coarse tick processor is arranged to decide whether the signal likely includes a tick; and, only if the course tick processor decides that the audio signal likely includes a tick, to enable the fine tick processor to decide, by more thorough processing of said audio signal, whether the audio signal represents a tick on the device, wherein the fine tick detection is performed using a comparison with a previously trained set of reference properties that are characteristic for the device with which the audio signal is received.

10. System according claim 9, comprising a mobile telecommunication device comprising a microphone, coupled to the coarse tick detection processor and the fine tick processor to supply the stream of audio samples.

11. System according to claim 9, wherein the coarse tick processor is adapted for buffering a series of the audio samples (y(n), (y'(n)) in a buffer, for determining maximum and minimum values from the buffer, computing a local range between the maximum and the minimum, for delaying said local range with one or more samples and for comparing a difference between the actual local range and the delayed local range with a threshold value ($T_c$), and for, if the difference exceeds the threshold value, outputting a trigger ($n_c$) for enabling said fine tick processor.

12. System according to claim 9, wherein the fine tick processor is adapted for buffering the audio samples (y(n), (y'(n)) from a time interval that includes the tick that has been decided by the coarse tick detection into buffer contents that include a buffer content with said tick and a buffer content that precedes said tick, for computing, for each buffer content ($B_p(n,m)$), a Fast Fourier Transformed buffer content ($E_c(w,m)$), for obtaining frequency components from the Fast Fourier Transformed buffer content ($E_c(w,m)$), for determining a difference ($F_c(w,m)$) between the frequency components for the buffer contents with said tick and preceding said tick, for comparing said difference ($F_c(w,m)$) to contents of a previously trained reference set ($F^*(w,m)$) and calculating a correlation coefficient ($\rho(F_c,F^*)$) between them, for comparing said correlation coefficient to a threshold value ($T_p$) and for, if the correlation coefficient exceeds the threshold value, outputting a signal indicating a presence of the tick in the audio signal.

13. System according to claim 9, including a preprocessor adapted for preprocessing the audio signal before being processed in the coarse and/or fine processors respectively, the preprocessor being arranged for determining and outputting a difference ($y'(n)$) between each audio sample ($y(n)$) and a previous audio sample ($y(n-x)$).

14. System according to claim 9, comprising a mobile communication device with a microphone coupled to the coarse tick detection processor and the fine tick processor, the fine tick processor being configured to trigger mutual identification of, or opening of a communication channel between, a pair of mobile communication devices that includes the mobile communication device, in response to fine tick detection.

15. Consumer product, adapted for carrying out the method according to claim 1, and/or comprising the system according to claim 9.

16. Consumer product according to claim 15, which is a mobile telephone device or a PDA.

17. Server for identifying proximate devices, adapted for carrying out the method according to claim 1 and/or comprising the system according to claim 9.

18. The method according to claim 1, comprising executing, before said applying the audio signal to the coarse tick detection processor and enabling the fine tick detection processor, the preceding steps of:
   signalling when a reference touch or respective reference touches are generated on the device,
   determining reference properties of a reference audio signal obtained from the device at a time of the signaled touch or respective touches;
   storing the reference properties, or averages of the reference properties obtained with the respective touches, as the reference properties that are characteristic for the device; and
   wherein the fine tick detection is performed using a comparison with the reference properties that are characteristic for the device.

19. The system according to claim 9, the system being configured to receive signals when a reference touch or respective reference touches are generated on the device, determine reference properties of a reference audio signal obtained from the device at a time of a signaled touch or respective touches and store the reference properties, or averages of the reference properties obtained with the respective touches, as the reference properties that are characteristic for the device, the fine tick processor being configured to perform the comparison with the reference properties that are characteristic for the device.

20. A method for detecting ticks in a noisy environment, from an audio signal received by a device, the audio signal including a stream of audio samples ($y(n)$, $y'(n)$), the method comprising the steps of:
   applying the audio signal to a coarse tick detection processor adapted to decide whether the audio signal likely includes a tick; and
   only if the course tick processor decides that the audio signal likely includes a tick, enabling a fine tick detection processor to decide, by more thorough processing of said audio signal, whether the audio signal represents a tick, wherein the fine tick detection is performed using a comparison with predetermined reference properties that are characteristic for the device with which the audio signal is received, suppressing influence of background signals, by
   computing Fourier transforms of the audio samples in a plurality of buffers;
   determining differences between energies of respective frequency components of the Fourier transforms for successive buffers; and
   comparing the differences to contents of a previously trained reference set.

21. The method according to claim 20, wherein the Fourier transforms of the audio samples are computed in buffers $B_p(n_c,m)$, wherein $B_p(n_c,m)=\{y'(n_c(m)-N_p), \ldots, y'(n_c(m)-2), y'(n_c(m)-1)\}$,
   wherein $n_c$ is a sample number corresponding to a coarse touch, m is an index of a buffer, $N_p$ a number of samples in the buffer and $n_c(m)=n_c+mN_p(1-p)$, with p in the interval [0,1]
   said determining the difference comprising determining a difference $F_c(\omega,m')=E_c(\omega,m')-E(\omega,m'-1)$ between the energies $E_c(\omega,m')$ and $E_c(\omega,m'-1)$ of respective frequency components at frequencies $\omega$ of the Fourier transforms for successive buffer numbers m', m'−1; and
   said comparing comprising comparing the differences ($F_c(\omega,m)$) to the content of the previously trained reference set ($F^*(\omega,m)$).

22. A system for detecting ticks from a noisy environment in an audio signal received by a device, wherein the audio signal includes a stream of audio samples ($y(n)$, $(y'(n))$ of the noisy environment, the system comprising a coarse tick detection processor and a fine tick detection processor, wherein the coarse tick detection processor is adapted to decide whether the audio signal likely includes a tick; and, only if the course tick processor decides that the audio signal likely includes a tick, to enable the fine tick detection processor to decide, by more thorough processing of said audio signal, whether the audio signal represents a tick, wherein the fine tick detection processor is configured to perform a comparison with predetermined reference properties that are characteristic for the device with which the audio signal is received, suppressing influence of background signals, by
   computing Fourier transforms of the audio samples in a plurality of buffers;
   determining differences between energies of respective frequency components of the Fourier transforms for successive buffers; and
   comparing the differences to contents of a previously trained reference set.

23. The system according to claim 22, wherein the fine tick detection processor is configured to compute said Fourier transforms of the audio samples in buffers $B_p(n_c,m)$ $B_p(n_c,m)=\{y'(n_c(m)-N_p), \ldots, y'(n_c(m)-2), y'(n_c(m)-1)\}$, wherein $n_c$ is a sample number corresponding to a coarse touch, m is an index of a buffer $B_p(n_c,m)$, $N_p$ is a number of samples in the buffer and $n_c(m)=n_c+mN_p(1-p)$, with p in the interval [0,1]; and wherein the fine tick detection processor is configured to:

determine a difference $F_c(\omega,m')=E_c(\omega,m')-E(\omega,m'-1)$ between the energies $E_c(w,m')$ and $E_c(w,m'-1)$ of respective frequency components at frequencies w of the Fourier transforms for successive buffer numbers m', m'−1; and comparing the differences ($F_c(w,m)$) to the content of the previously trained reference set ($F^*(w,m)$).

* * * * *